United States Patent
Bezrukov et al.

(10) Patent No.: US 9,304,978 B2
(45) Date of Patent: Apr. 5, 2016

(54) MAINTENANCE OF XML DOCUMENTS

(75) Inventors: Vladislav Bezrukov, Leimen (DE); Hartwig Seifert, Elchesheim-Illingen (DE); Nikhil Dhairyawan, Eppelheim (DE); Andreas Hirche, Hirschberg (DE)

(73) Assignee: SAP SE, Walldorf, DE (US)

( * ) Notice: Subject to any disclaimer, the term of this patent is extended or adjusted under 35 U.S.C. 154(b) by 1425 days.

(21) Appl. No.: 12/111,150

(22) Filed: Apr. 28, 2008

(65) Prior Publication Data

US 2008/0288513 A1    Nov. 20, 2008

Related U.S. Application Data

(63) Continuation of application No. 10/695,375, filed on Oct. 28, 2003, now Pat. No. 7,380,205.

(51) Int. Cl.
G06F 7/00 (2006.01)
G06F 17/30 (2006.01)
G06F 17/22 (2006.01)

(52) U.S. Cl.
CPC .................................. *G06F 17/2229* (2013.01)

(58) Field of Classification Search
USPC ......... 707/791, 793, 795, 796, 802, 807, 808, 707/809
See application file for complete search history.

(56) References Cited

U.S. PATENT DOCUMENTS

| | | | |
|---|---|---|---|
| 2002/0133516 A1* | 9/2002 | Davis et al. | 707/513 |
| 2003/0009472 A1 | 1/2003 | Azami et al. | |
| 2003/0069881 A1* | 4/2003 | Huttunen | 707/5 |
| 2003/0229852 A1 | 12/2003 | Uramoto et al. | |
| 2004/0034830 A1 | 2/2004 | Fuchs et al. | |
| 2004/0064481 A1* | 4/2004 | Azami | 707/104.1 |
| 2004/0103105 A1* | 5/2004 | Lindblad et al. | 707/100 |
| 2004/0139091 A1 | 7/2004 | Shin | |
| 2004/0210946 A1 | 10/2004 | Shin | |
| 2005/0171833 A1* | 8/2005 | Jost et al. | 705/10 |

OTHER PUBLICATIONS

Bohlmann et al,. "From XML to ABAP Data Structures and Back: Bridging the Gap with XSLT," Jul. 2002, SAP Professional Journal, pp. 31-57.*
Marc Girardot, Neel Sundaresan, "Efficient Representation and Streaming of XML Content Over the Internet Medium," IEEE 2000, pp. 67-70.

* cited by examiner

*Primary Examiner* — Hexing Liu
(74) *Attorney, Agent, or Firm* — Fountainhead Law Group PC

(57) ABSTRACT

A system and a method of maintaining extensible markup language (XML) document includes splitting an XML document into fragments according to rules stored in a configuration file, binding each of the fragments to an object in a content management system, and providing a reference between the XML document and the fragments.

26 Claims, 3 Drawing Sheets

MAINTENANCE OF XML DOCUMENTS

CROSS REFERENCE TO RELATED APPLICATIONS

This invention is a continuation of and claims the benefit of priority from U.S. patent application Ser. No. 10/695,375, filed Oct. 28, 2003, entitled "Maintenance of XML Documents," the disclosure of which is hereby incorporated herein by reference.

TECHNICAL FIELD

This invention relates to maintenance of XML documents.

BACKGROUND

XML (Extensible Markup Language) is a flexible way to generate common information formats and share both the format and the data on the World Wide Web, intranets, and elsewhere. XML is similar to hypertext markup language (HTML). Both XML and HTML include markup symbols to describe a file or page's contents. HTML describes the content in terms of how the content is displayed while XML describes the content in terms of what data is being described. Thus, an XML file can be processed purely as data by a program. Alternately, the XML file can be displayed or stored.

SUMMARY

In one aspect, the invention features a system and a method of maintaining extensible markup language (XML) document. The method includes having rules in a configuration file, splitting an XML document into fragments according to the rules, binding each of the fragments to an object in a content management system, and providing a reference between the XML document and the fragments.

Embodiments may include one or more of the following. The method can include storing the content associated with a fragment in the content management system. The method can include associating the content with a particular object in the content management system. The method can include replacing the content associated with each fragment with a link to the object in the content management system. The method can include associating multiple fragments with a particular object in the content management system. The method can include detecting an outgoing reference to an object attribute and ensuring the reference is unique.

In another aspect, the system and method can include setting the rules according to an application. The rules can also include sub-rules, encoding rules and/or a fragment rules. Fragment relation rules remove a fragment from the XML document and replace the fragment with a reference. The rules a can also include configuration rules, and the configuration rules can include an unparsed object rule that extracts a string associated with an unparsed object and replaces the string with a reference and/or a hyperlink rule that replaces a link to another object attribute with a reference. The sub-rules can include a pattern rule that extracts textual content from a fragment, a class rule that provides a class name to an object, an attribute rule that assigns each object with an attribute type. The attribute type can include a logical object (LOIO) or a physical object (PHIO). Encoding rules can include internal entity encoding rules, external name encoding rules, unparsed object encoding rules, and/or hyperlink encoding rules.

In another aspect, the fragment can include a sub-fragment. The method can include binding the sub-fragment to an object in a content management system, and providing a reference between the fragment and the sub-fragment.

In another aspect, the invention features a computer program product, tangibly embodied in an information carrier, for executing instructions on a processor, the computer program product being operable to cause a machine to split an XML document into fragments according to rules stored in a configuration file, bind each of the fragments to an object in a content management system, and provide a reference between the XML document and the fragments.

Embodiments may include one or more of the following. The computer program product can be configured to cause the machine to store the content associated with a fragment in the content management system. The computer program product can be configured to cause the machine to associate the content with a particular object in the content management system. The computer program product can be configured to cause the machine to replace the content associated with each fragment with a link to the object in the content management system. The computer program product can be configured to cause the machine to associate multiple fragments with a particular object in the content management system. The computer program product can be configured to bind the sub-fragment to an object in a content management system and provide a reference between the fragment and the sub-fragment.

In another aspect, the invention features a system including a means for splitting an XML document into fragments according to rules stored in a configuration file, a means for binding each of the fragments to an object in a content management system, and a means for providing a reference between the XML document and the fragments.

Embodiments may include one or more of the following. The system can include a means for storing the content associated with a fragment in the content management system. The system can include a means for associating the content with a particular object in the content management system. The system can include a means for replacing the content associated with each fragment with a link to the object in the content management system. The system can include a means for associating multiple fragments with a particular object in the content management system. The system can include a means for binding a sub-fragment to an object in a content management system and a means for providing a reference between the fragment and the sub-fragment.

In another aspect, the invention features a method including the steps of splitting an XML document into fragments according to rules stored in a configuration file, binding each of the fragments to an object in a content management system, and providing a reference between the XML document and the fragments.

Embodiments may include one or more of the following. The method can also include a step of storing the content associated with a fragment in the content management system. The method can also include a step of associating the content with a particular object in the content management system. The method can also include a step of replacing the content associated with each fragment with a link to the object in the content management system. The method can also include a step of associating multiple fragments with a particular object in the content management system. The method can also include a step of binding a sub-fragment to an object in a content management system and a step of providing a reference between the fragment and the sub-fragment.

One or more aspects of the invention may provide one or more of the following advantages.

The content management system splits an XML document into fragments according to rules. This fragmentation allows the reuse of fragments in other XML documents. Reuse of content can reduce generation and/or maintenance cost of the XML document since content does not have to be generated multiple times for each XML document.

The use of reference encoding rules to introduce an object-reference as part of the reference name provide uniqueness in naming. The object-reference part in the name avoids possible name duplications between content management system objects.

Automatic fragmentation according to rules facilitates the fragmentation process eliminating the need for a user to manually split the document into fragments. This reduces the work for fragmentation and makes the fragmentation process consistent between documents.

Fragmentation rules allow tuning of fragments' location without creating unnecessary fragments (comparing to a level-based approach).

Other features, objects, and advantages of the invention will be apparent from the description and drawings, and from the claims.

DETAILED DESCRIPTION

Figure 1:
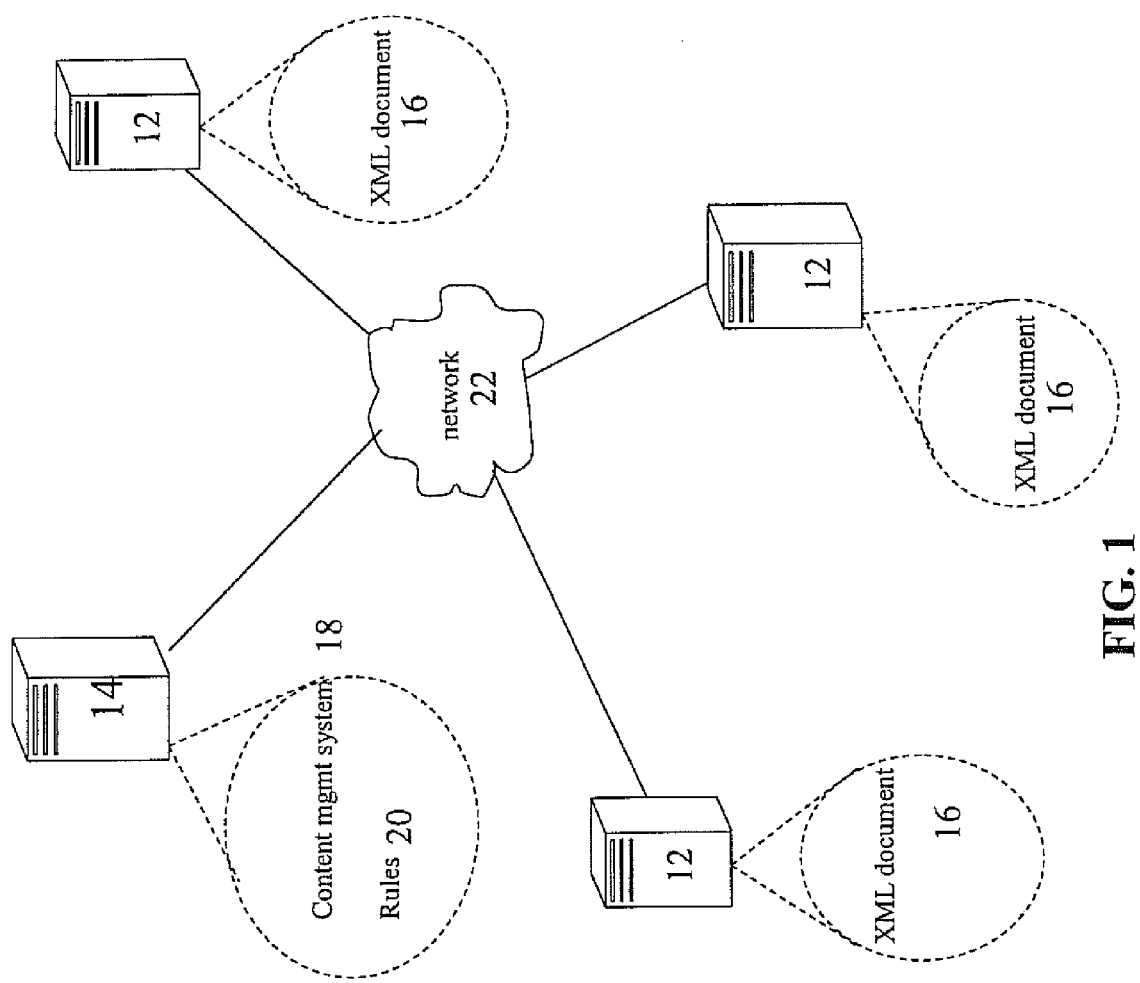
FIG. 1 is a block diagram of a system.

As shown in FIG. 1, a system 10 in accordance with the invention includes a client 12 and a server 14. System 10 is a client-server network. In a client-server network, one server 14 is activated and awaits client requests. Typically, multiple client programs share the services of a common server program. Client 12 includes an extensible markup language (XML) document 16. Server 14 includes a content management system (CMS) 18 and rules 20. Server 14 communicates with client 12 over a network 22.

Figure 2:
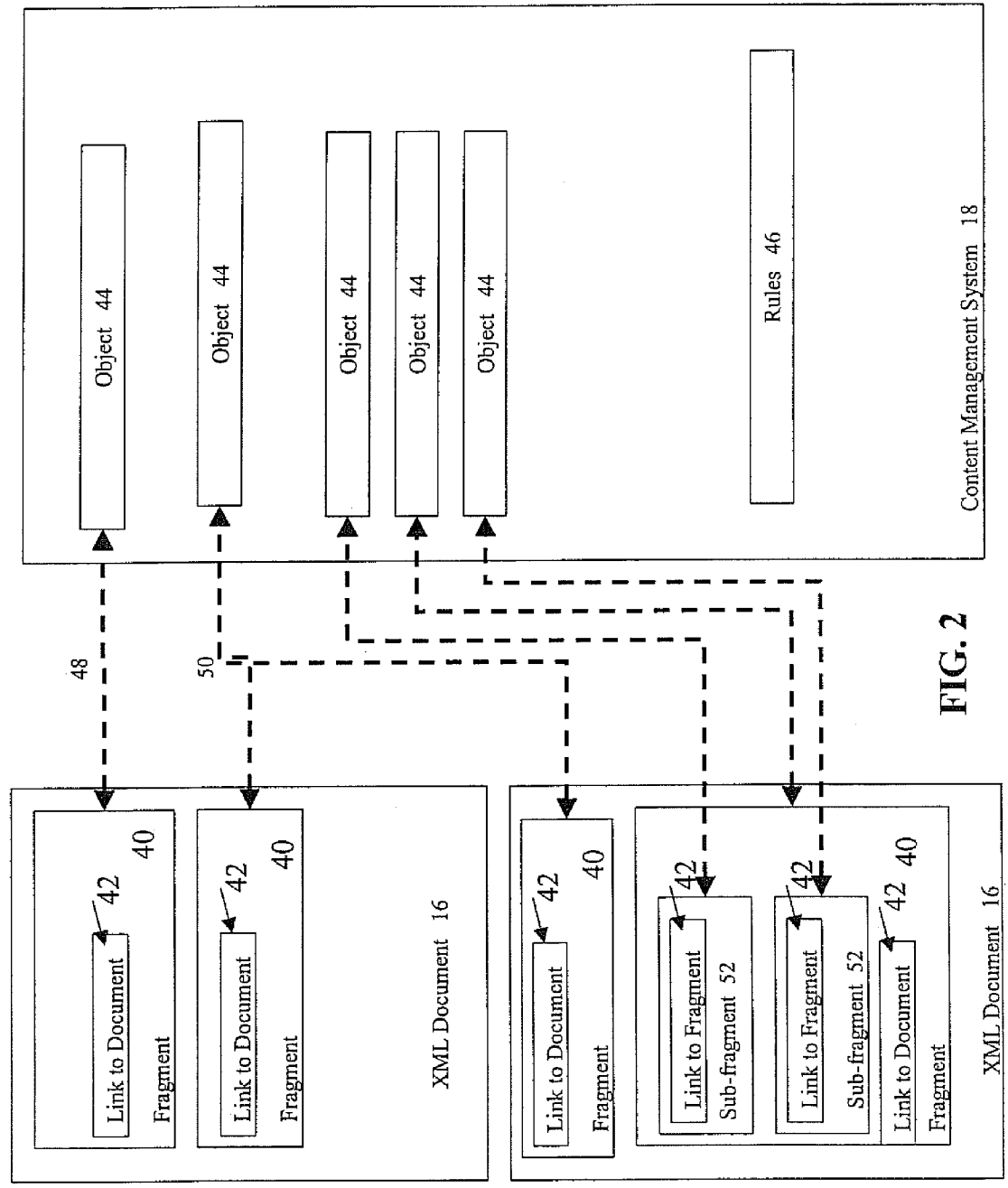
FIG. 2 is a block diagram of an XML document and a content management system.

As shown in FIG. 2, content management system 18 fragments XML document 16 into fragments 40, the fragments 40 having links 42 to the XML document 16. Content management system 18 includes objects 44 and rules 20. Each fragment 40 is associated with an object 44 (as represented by dotted line 48). Content management system 18 splits the XML document 16 into smaller pieces (i.e., fragments 40) according to the rules 20. This fragmentation allows the reuse of fragments 40 in other XML documents 16 (as shown by dotted line 50). Reuse of content among multiple XML documents can reduce generation and/or maintenance cost of the XML document 16. More specifically, a fragment of content originally included in an XML document 16 is stored as an object 44. This object 44 can be used by multiple XML documents 16. Thus, the content does not have to be generated for each XML document 16. Instead, only a proper reference to the fragment 40 and object 44 is included in the XML document. For example, a copyright statement can be re-used in multiple documents. The content management system 18 stores the content as an object 44 in the content management system 18. When the content management system 18 fragments an XML document 16, the content management system 18 establishes a reference (e.g., a link 42) between the XML document 16 and its fragments 40. The content management system 18 uses links 42 to assemble (or reassemble) the XML document 16 from the document's fragments 40. Fragments 40 can include sub-fragments 52 (i.e. fragments of fragments 40). The content management system 18 establishes links between the sub-fragments 52 and the XML document 16.

Figure 3:
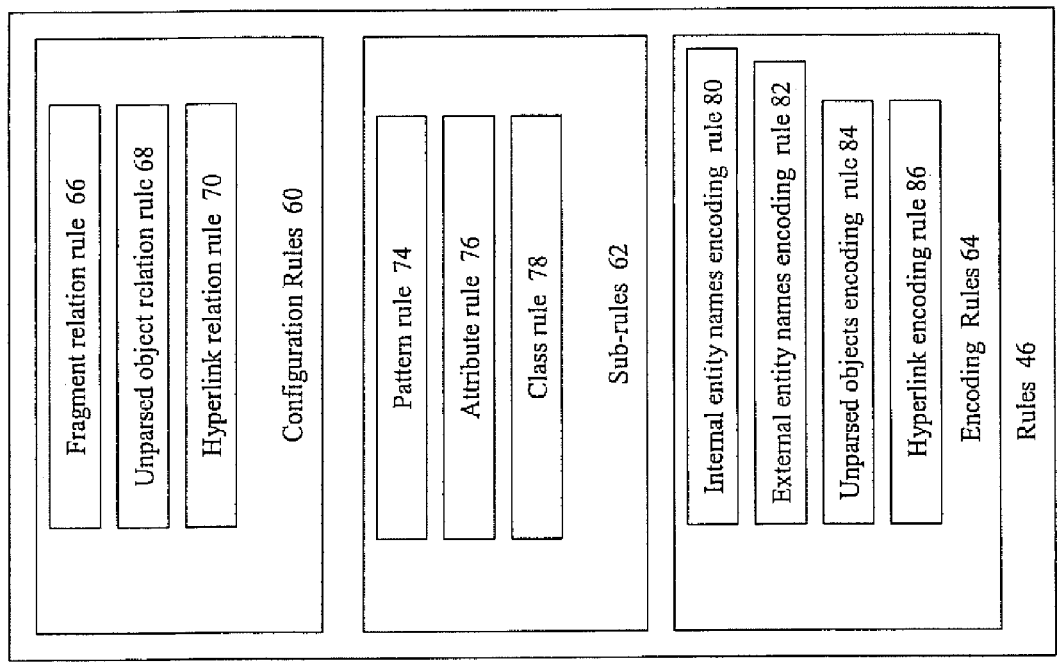
FIG. 3 is a block diagram of rules included in the content management system.

As shown in FIG. 3, to fragment XML documents 16, the content management system 18 includes rules 20. The rules 20 include configuration rules 60, sub-rules 62, and encoding rules 64. Configuration rules 60 include fragment relation rules 66, unparsed object relation rules 68, and hyperlink relation rules 70. Sub-rules 62 include pattern rules 74, attribute rules 76, and class rules 78. Encoding rules 64 include internal entity name encoding rules 80, external entity name encoding rules 82, unparsed object encoding rules 84, and hyperlink encoding rules 86.

The content management system 18 uses configuration rules 60 to analyze the content of an XML document 16, split the XML document into fragments 40 and sub-fragments 52, and detect relations to the non-XML objects. The configuration rules 60 classify relations between XML document 16, fragments 40, and objects 44. A first type, represented by fragment relation rules 66, is based on a relation between any two XML fragments 40 where the target object 44 is also a part of the XML document 16. A second type, represented by unparsed object relation rules 68, is based on a relation between an XML object 44 and an unparsed object (e.g., image) where the unparsed object is also a part of the XML document 16. A third type, represented by hyperlink relation rules 70, is based on a relation from an XML object 44 that points to another object 44, but the target object is not part of the XML document 16.

The fragment relation rules 66 detect and generate a relation from a XML fragment 40 to another XML fragment since the target XML fragment 40 represents a logical part of the first XML fragment 40. The content management system 18 relies on this relation for assembling (or reassembling) the document by traversing all fragment relations.

The following is an example of the use of the fragment relation rules 66:

```
<Fragment id="lesson">
<Pattern>...</Pattern>
<Infoclass>...</Infoclass>
<SetAttribute type='PHIO'>...</SetAttribute>
</Fragment>.
```

The attribute "id" is used for distinction between fragments 40 generated by fragment relation rules 66. The content management system 18 locates fragments 40 using the fragment relation rules 66 based on the sub-rule "<Pattern>". Content management system 18 treats each fragment 40 as a new object 44 and generates a fragment relation from the fragmented XML document 16 to the new fragment 40. The content of the XML document 16 is changed. Content management system 18 removes the content of fragment 40 from XML document 16 and generates a reference replacing the fragment body. For example, the reference can be expressed in the XML entity syntax (or any other syntax that is supported by the available XML parser or/and the content management system 18 (e.g., W3C XML Include syntax)).

Unparsed object relation rules 68 detect and generate the relation from an XML fragment 40 to a non-XML (e.g., unparsed) object 44, for example, to an image. The target non-XML object semantically belongs to the fragment 40 (e.g., the referenced image is printed out along with the rendered XML fragment 40 when rendering is requested). However, an XML parser cannot parse the target non-XML object. Thus, the operations like validation that deal with XML sources can filter out the non-XML objects.

The following is an example of the use of object relation rules 68:

```
<UnparsedObject id="icon">
<Pattern>...</Pattern>
<Infoclass>...</Infoclass>
<SetAttribute type='PHIO'>...</SetAttribute>
</Fragment>.
```

The content management system 18 uses the attribute "id" to classify unparsed objects according to the unparsed object relation rules 68. The content management system 18 uses unparsed object relation rules 68 to extract a string from the XML fragment 40 that includes an encoded link to the unparsed object. Since the unparsed object relation rule 68 can imply generation of new content management system (CMS) objects (fragments 40), e.g. when importing an XML document into content management system, this rule provides to the content management system 18 all necessary information to be able to generate objects 44.

Hyperlink relation rules 70 are used to detect and generate the relation from the XML fragment 40 to an object 44 when the target object does not semantically belong to the fragment 40 (i.e., the target object will not be printed out along with the rendered XML fragment 40 when rendering is requested). Such a reference is used for HTML rendering or for interactive document representation including hypertext references.

The following is an example of the use of hyperlink relation rules 70:

```
<HyperlinkDefinition id="url">
<Pattern>
<Element>...</Element>
<Attribute>...</Attribute>
</Pattern>
</HyperlinkDefinition>
```

The content management system 18 uses the hyperlink relation rule 70 to classify hyperlinks. This hyperlink relation rule 70 extracts a string from the XML fragment 40 that includes a hyperlink.

The content management system 18 includes sub-rules 62. A pattern rule 74 locates a reference within the fragment 40. An attribute rule 76 binds CMS content to the CMS object attribute. A class rule 78 is used to classify newly created objects 44.

The content management system 18 uses the pattern rule 74 (included in the sub-rules 62) to locate an existing reference (e.g., fragment, unparsed object, or hyperlink) within the given XML fragment 40. XML pattern rule 74 is split into "<Element>" and optional "<Attribute>" parts. An <Element> part is used for addressing an XML element and an <Attribute> includes the attribute of the located element. Example 1 below shows a pattern rule 74 without attributes. Example 2 shows a pattern rule 74 having attributes.

The following is an example (example 1) of the use of the pattern rule 74:

```
<Pattern>
<Element>//URL</Element>
</Pattern>
```

The following is an example (example 2) of the use of the pattern rule 74:

```
<Pattern>
<Element>/SAPCourse</Element>
<Attribute>PublicationDate</Attribute>
</Pattern>
```

Pattern rule 74 extracts the textual content of the addressed element/attribute.

The content management system 18 uses the attribute rule 76 (included in the sub-rules 62) to bind the XML content located by <Pattern> to the CMS object attribute <ObjAttribute>.

The following is an example of the use of attribute rule 76:

```
<SetAttribute type='PHIO'>
<ObjAttribute>LANGUAGE</ObjAttribute>
<Pattern>...</Pattern>
</SetAttribute>
```

The attribute 'type' shows the CMS object type (e.g., logical object "LOIO" or physical object "PHIO"). The attribute rule 76 describes a singular attribute binding. For binding of multiple attributes, multiple attribute rules 76 are defined.

The content management system 18 uses the class rule 78 (included in the sub-rules 62) for assigning the specified LOIO and PHIO classes to the object 44 detected by the rule. For example, if a fragment relation rule 66 detects (by <Pattern>) a new fragment 40, this detected fragment 40 is presented as a new object 44. In order to generate object 44, the LOIO and PHIO class information is used. The class rule 78 provides these class names. Another use of these subrules is to determine which fragment/unparsed object rule corresponds to the object 44 to be processed. The class rule 78 is used, for example, when a fragment 40 gets checked in and the attribute binding rules <SetAttribute> are applied to the fragment 40 in order to transfer the (possibly) updated XML content to the CMS object attributes. In this case, this rule works in an opposite way to the <Pattern> rule (<Pattern> is used to locate fragment 40 within the XML document for the given fragment rule, <Infoclass> is used to locate the fragment rule within the set of configuration rules for the given XML document). Such a use of this subrule might be ambiguous, but still correct (CMS attributes are defined in the classes, so the attribute binding is technically always correct in this case).

The following is an example of the use of the class rule 78:

```
<Infoclass>
<LoIOClass>XML_GEN</LoIOClass>
<PhIOClass>XML_GENSRC</PhIOClass>
</Infoclass>
```

The content management system 18 uses reference encoding rules 64 to make references unique throughout the document (which can include some CMS objects). The reference encoding rules 64 introduce an object-reference as a part of the reference name, thus providing uniqueness. The object-reference part in the name avoids possible name duplications between CMS objects.

The encoding rules 64 can include separate ways to encode internal entity names, external entity names, unparsed objects, and hyperlinks.

An internal entity name can be referenced, for example, by <!ENTITY myInternalEntity.sap-int.12345678901234-

56789012345.MY_CLASS "value"> where myInternalEntity is user-defined-name, sap-int. is the delimiter indicating the reference is an internal entity name, and 12345678901234567890112345.MY_CLASS includes CMS object information. This encoding of an internal entity name is based on the internal entity name encoding rule 80.

An external entity name can be referenced, for example, by <!ENTITY myExternalEntity.sap.1111.MY_CLASS SYSTEM " . . . "> where myExternalEntity is user-defined-name, .sap. is the delimiter indicating the reference is external entity name, and 1111.MY_CLASS includes CMS object information like object GUID and CMS class, that uniquely identifies the referenced object 44. This encoding of an external entity name is based on the external entity name encoding rule 82.

An unparsed object can be referenced, for example, by <myGraphicFileRef="logo.jpg.sap.22222.MY_CLASS"> where logo.jpg is user-defined-name, .sap. is the delimiter indicating the reference is external, and 2222.MY_CLASS includes CMS object information like object GUID and CMS class, that uniquely identifies the referenced object. This encoding of an unparsed object relies on the unparsed object encoding rule 84.

A hyperlink can be referenced, for example, by <URL url="mRefDocument.txt.sap.3333.MY_CLASS"> where myRefDocument.txt is user-defined-name, .sap. is the delimiter indicating the reference points to a CMS object, 3333.MY_CLASS includes CMS object information like object GUID and CMS class that uniquely identifies the referenced object. This encoding of a hyperlink relies on the hyperlink encoding rule 86.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of embodiments of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications can be made without departing from the spirit and scope of the invention.

What is claimed is:

1. A computer-implemented method for maintaining extensible markup language (XML) documents comprising:
    processing a first XML document at a content management server so as to split the first XML document into fragments of content according to rules stored in a configuration file;
    for each fragment of the first XML document, generating i) an object at the content management server to which the fragment of content is bound, the object including content for the fragment, and ii) a reference to replace the fragment of content in the first XML document, said reference expressed in XML and referring to the object at the content management server to which the fragment of content is bound;
    processing a second XML document at the content management server so as to split the second XML document into fragments of content according to rules stored in the configuration file; and
    reusing one of the fragments of the first XML document in the second XML document that includes different content from the first XML document, the reusing including the reference in the second XML document referring to the object at the content management server to which the one of the fragments of the first XML document is bound, wherein the content for the object in the second XML document is identical to content for the object in the first XML document, wherein the object is not stored again at the content management server for the second XML document.

2. The computer-implemented method of claim 1, further comprising:
if a fragment of the first XML document includes content, associating the content from the fragment with the object in the content management system before storing the content in the content management system.

3. The computer-implemented method of claim 2, wherein the rules include a fragment rule, the method further comprising:
processing the first XML document in accordance with the fragment rule to detect within each fragment of the first XML document any references, expressed in XML, to other fragments within the first XML document; and
replacing those references to other fragments within the first XML document with references to objects at the content management server.

4. The computer-implemented method of claim 3, wherein any reference to an object at the content management server is expressed so as to indicate whether the object to which it refers is internal or external.

5. The computer-implemented method of claim 4, wherein any reference to an object at the content management server is expressed so as to ensure the uniqueness of the reference to the object.

6. The computer-implemented method of claim 2, wherein the rules include an unparsed object rule, the method further comprising:
processing the first XML document in accordance with the unparsed object rule to detect within each fragment of the first XML document any references, not expressed in XML, to other objects; and
replacing those references to other objects with references to objects at the content management server.

7. The computer-implemented method of claim 6, wherein any reference to an object at the content management server is expressed so as to indicate whether the object to which it refers is internal or external.

8. The computer-implemented method of claim 6, wherein any reference to an object at the content management server is expressed so as to ensure the uniqueness of the reference to the object.

9. The computer-implemented method of claim 2, wherein the rules include a hyperlink rule, the method further comprising:
processing the first XML document in accordance with the hyperlink rule to detect within each fragment of the first XML document any references, expressed in hypertext markup language (HTML), to other objects; and
replacing those references, expressed in HTML, to other objects with references to objects at the content management server.

10. The computer-implemented method of claim 9, wherein any reference to an object at the content management server is expressed so as to indicate whether the object to which it refers is internal or external.

11. The computer-implemented method of claim 9, wherein any reference to an object at the content management server is expressed so as to ensure the uniqueness of the reference to the object.

12. The computer-implemented method of claim 1 wherein at least one fragment includes a sub-fragment of content to which an object in the content management system is bound, said method further comprising:
for the sub-fragment of content, generating i) an object at the content management server to which the sub-fragment of content is bound, the object including content for the sub-fragment, and ii) a reference to replace the sub-fragment of content in the first XML document, said reference expressed in XML and referring to the object being stored at the content management server to which the sub-fragment of content is bound.

13. The computer-implemented method of claim 1, further comprising
configuring the rules by which fragments are split from the first XML document so as to meet requirements of a particular application.

14. A non-transitory computer-readable storage medium, having instructions for executing on a computer, the instructions being operable to:
process a first XML document at a content management server so as to split the first XML document into fragments of content according to rules stored in a configuration file;
for each fragment of the first XML document, generate i) an object at the content management server to which the fragment of content is bound, the object including content for the fragment, and ii) a reference to replace the fragment of content in the first XML document, said reference expressed in XML and referring to the object at the content management server to which the fragment of content is bound;
process a second XML document at the content management server so as to split the second XML document into fragments of content according to rules stored in the configuration file; and
reuse one of the fragments of the first XML document in the second XML document that includes different content from the first XML document, the reusing including the reference in the second XML document referring to the object at the content management server to which the one of the fragments of the first XML document is bound, wherein the content for the object in the second XML document is identical to content for the object in the first XML document, wherein the object is not stored again at the content management server for the second XML document.

15. The computer-readable storage medium of claim 14, further operable to:
if a fragment of the first XML document includes content, associate the content from the fragment with the object in the content management system before storing the content in the content management system.

16. The computer-readable storage medium of claim 15, further operable to:
process the first XML document in accordance with a fragment rule to detect within each fragment of the first XML document any references, expressed in XML, to other fragments within the first XML document; and
replace those references to other fragments within the first XML document with references to objects at the content management server.

17. The computer-readable storage medium of claim 16, wherein any reference to an object at the content management server is expressed so as to indicate whether the object to which it refers is internal or external.

18. The computer-readable storage medium of claim 16, wherein any reference to an object at the content management server is expressed so as to ensure the uniqueness of the reference to the object.

19. The computer-readable storage medium of claim 15, further operable to:
   process the first XML document in accordance with an unparsed object rule to detect within each fragment of the first XML document any references, not expressed in XML, to other objects; and
   replace those references to other objects with references to objects at the content management server.

20. The computer-readable storage medium of claim 19, wherein any reference to an object at the content management server is expressed so as to indicate whether the object to which it refers is internal or external.

21. The computer-readable storage medium of claim 19, wherein any reference to an object at the content management server is expressed so as to ensure the uniqueness of the reference to the object.

22. The computer-readable storage medium of claim 15, further operable to:
   process the first XML document in accordance with a hyperlink rule to detect within each fragment of the first XML document any references, expressed in hypertext markup language (HTML), to other objects; and
   replace those references, expressed in HTML, to other objects with references to objects at the content management server.

23. The computer-readable storage medium of claim 22, wherein any reference to an object at the content management server is expressed so as to indicate whether the object to which it refers is internal or external.

24. The computer-readable storage medium of claim 22, wherein any reference to an object at the content management server is expressed so as to ensure the uniqueness of the reference to the object.

25. The computer-readable storage medium of claim 14, wherein at least one fragment includes a sub-fragment of content to which an object in the content management system is bound, said computer program product further operable to:
   for the sub-fragment of content, generate i) an object at the content management server to which the sub-fragment of content is bound, the object including content for the sub-fragment, and ii) a reference to replace the sub-fragment of content in the first XML document, said reference expressed in XML and referring to the object at the content management server to which the sub-fragment of content is bound.

26. The computer-readable storage medium of claim 14, further operable to:
   facilitate configuration of the rules by which fragments are split from the first XML document so as to meet requirements of a particular application.

* * * * *